United States Patent
Hafez et al.

(10) Patent No.: US 10,359,317 B2
(45) Date of Patent: Jul. 23, 2019

(54) METHOD FOR DETECTING THERMAL EMISSIONS OF THE NEW MOON

(71) Applicant: King Abdul Aziz City for Science and Technology (KACST), Riyadh (SA)

(72) Inventors: Yaser A Hafez, Riyadh (SA); Hamoud H Alharbi, Riyadh (SA)

(73) Assignee: King Abdul Aziz City for Science and Technology (KACST), Riyadh (SA)

( * ) Notice: Subject to any disclaimer, the term of this patent is extended or adjusted under 35 U.S.C. 154(b) by 577 days.

(21) Appl. No.: 13/954,855

(22) Filed: Jul. 30, 2013

(65) Prior Publication Data

US 2015/0036718 A1    Feb. 5, 2015

(51) Int. Cl.
*G01J 5/00* (2006.01)
*G01J 5/10* (2006.01)

(52) U.S. Cl.
CPC .......... *G01J 5/10* (2013.01); *G01J 2005/0055* (2013.01); *G01J 2005/0077* (2013.01)

(58) Field of Classification Search
USPC ................................................... 374/121, 141
See application file for complete search history.

(56) References Cited

U.S. PATENT DOCUMENTS

| | | | | |
|---|---|---|---|---|
| 3,744,913 A * | 7/1973 | Farthing | .............. | G01S 3/782 250/203.1 |
| 4,082,462 A * | 4/1978 | Owen | .............. | G01S 5/16 250/203.6 |
| 8,217,326 B1 * | 7/2012 | Matthews | .............. | G01J 1/18 250/203.1 |
| 2004/0068564 A1 * | 4/2004 | Snoddy | .............. | G02B 23/00 709/225 |

FOREIGN PATENT DOCUMENTS

JP    2006313183 A  * 11/2006

OTHER PUBLICATIONS

Fang et al, "High frequancy thermal emission from lunar surface and near surface temeprature of the Moon from Chang'E-2 microwave radiometer", Jan. 9, 2014, Icarus, 232 (2014) 34-53.*
Maghrabi, "On the measurements of the moon's infrared temperature and its relation to the phase angle", Oct. 31, 2013, Space Research, 53 (2014) 339-347.*

* cited by examiner

*Primary Examiner* — Mirellys Jagan
(74) *Attorney, Agent, or Firm* — Steven M. Shape; Dennemeyer & Associates

(57) ABSTRACT

The invention provides a method for detecting thermal emissions from the new moon, wherein the new moon is positioned at an angle of less than about 5 degrees from the Sun. The invention utilizes a radio telescope, wherein a side-lobe level of the radio telescope is less than about −20 dB, wherein an effective telescope diameter of the radio telescope depends on a wavelength of operation. Further, a FWHM beamwidth of the radio telescope is less than about 0.5 degree. The method comprises setting one or more of the operating frequency of the radio telescope to a value selected from the range of about 1 GHz and about 100 GHz, and the operating bandwidth of the radio telescope to a value selected from the range of about 1 GHz and about 10 GHz. In addition, the method comprises collecting at least one observation from the radio telescope.

12 Claims, 4 Drawing Sheets

256,317 B2

METHOD FOR DETECTING THERMAL EMISSIONS OF THE NEW MOON

FIELD OF THE INVENTION

The invention generally relates to a method for detecting thermal emissions of the new moon when the new moon is in close proximity to the Sun.

BACKGROUND OF THE INVENTION

Observing the new moon from any geographical position in the world is a well known problem. When the Moon is very close to the Sun, it is even more challenging and sometimes impossible to view the Moon through the unaided eye. The Moon is visible from the earth mostly because of the scattered light from the Sun. When both the Sun and the new moon are at a low elevation, the atmosphere around the Sun becomes as bright as the new moon, thereby providing poor or no contrast for observing the new moon.

The unaided eye observations suffer from various sources of noise. First, the angular proximity of the Sun reduces the sensitivity of the human eye. Second, the important observations are normally carried out when the Sun/Moon system is close to the horizon. Optical wavelengths are greatly absorbed during horizontal propagation, especially at low altitude sites and in the presence of natural or artificial pollutants. Accordingly, it may not be possible to observe the Moon through the unaided eye during bad weather conditions such as in the presence of clouds.

Microwave imaging can be used to observe the Moon in the presence of such noises. For microwave imaging, it can be assumed that the Sun and the Moon are blackbody radiators with thermodynamic temperatures of 6000K and 200-250K respectively. According to the assumptions, the peak of Sun's emission is at a wavelength of about 0.55 micron, which corresponds to the color yellow at optical wavelengths. The peak of emission of a blackbody at 200-300K is in Infrared (IR) range, therefore the emissions of the new moon can be observed in the IR. However, when the Moon is observed through Earth's atmosphere, the IR radiations are subject to a considerable attenuation. This attenuation increases when the Moon is observed at a low elevation such as in case of the new moon.

Therefore, there is a need to observe the new moon in the radio wavelengths with greater accuracy when the new Moon is in close proximity to the Sun. In addition, there is a need to observe the new moon under circumstances such as bad weather and poor contrast of the Moon with respect to the Sun.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the invention.

Figure 1:
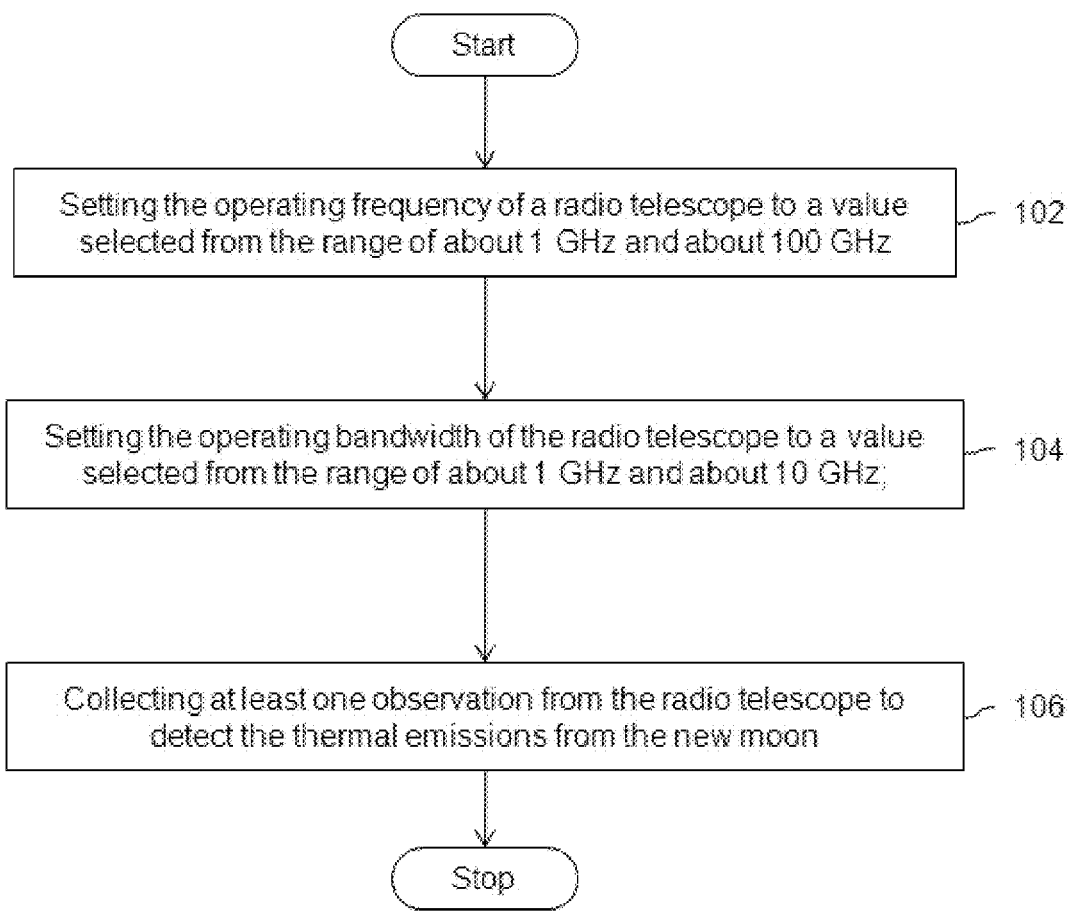
FIG. 1 illustrates a flow diagram of a method for detecting thermal emissions of the new moon in accordance with various embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the invention, it should be observed that the embodiments reside primarily in combinations of method steps related to a method for detecting thermal emissions of the new moon. Accordingly, the method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Various embodiments of the invention provide methods for detecting thermal emissions of the new moon. The invention enables detection of the new moon from different locations of the world under varied atmospheric conditions and elevation angles. The invention utilizes a radio telescope to detect radio emissions from the new moon. The radio emissions from the moon are a function of the wavelength and are transmitted from strata of the regolith whose depth is also proportional to the wavelength. In presence of a finite thermal conductivity of the regolith, a delay is introduced between the maximum optical emission and the maximum radio emission. This delay can be of several hours or even days. However, the delay does not affect the visibility of the radio emissions of the Moon because the measured radiation is averaged over an observing beam. This facilitates in mitigating the delay effect. For averaging the measured radiation, a beam approximately equivalent to the apparent Moon diameter is selected. In an embodiment, the apparent Moon diameter is 0.5 degree. In one embodiment, polarized radiations scattered from the Sun are observed at radio wavelengths, wherein the polarized radiations are free from the delay problem.

The method for detecting thermal emissions of the new moon includes adjusting one or more parameters of the radio telescope. The one or more parameters include, but are not limited to, operating frequency, operating bandwidth, sidelobe levels, Azimuth drive speed, position accuracy and system temperature of the radio telescope. The adjustment of the one or more parameters improves the sensitivity of the radio telescope and enables the radio telescope to detect the thermal emissions of the new moon even when the signal is weak. In accordance with an embodiment, each of the one or more parameters can be adjusted either at the time of building the radio telescope or during run-time.

In one embodiment, the radio telescope utilized for detecting the radio emissions is a prime-focus telescope having an effective telescope diameter of 3.8 meters (m). Further, a Full Width at Half Maximum (FWHM) of the prime-focus telescope is 0.5 degree. In addition, the operating frequency of the prime-focus telescope is adjusted to 10.3 GHz.

In accordance with various embodiments, the side-lobe values are adjusted to a value less than −20 dB for the new moon when the new moon is at a distance of 2 to 3 degrees from the Sun. For instance, the side-lobe values can be adjusted to −20 dB, −25 dB etc.

In an embodiment, the side-lobes are adjusted to a value less than about −25 dB for detecting the thermal emissions of the new moon. For observing the new moon at a distance of 2 to 3 degrees from the Sun, a polar diagram is required for a prime focus feed which is greater than or equal to −15 dB at an edge of a parabolic reflector. The method utilizes the radio telescope for obtaining a map of the sky containing both the Moon and the Sun in an area of about 15°×15°. The map is obtained in a relatively short time to avoid significant equatorial motion of the Moon relative to the Sun during the observation.

In accordance with an exemplary implementation of the method disclosed herein, 60 scans in azimuth are required for obtaining the map, when the FWHM of the radio telescope is 0.5 degree and the raster separation is 0.25 degree. In accordance with the exemplary implementation, the time required for creating the map is about 30 minutes wherein each 15 degree azimuth scan takes about 20 seconds with 10 seconds turnaround time.

FIG. 1 illustrates a flow diagram of the method for detecting thermal emissions of the new moon in accordance with various embodiments of the invention. In accordance with the various embodiments, the method utilizes the radio telescope for detecting the thermal emissions. In one embodiment, the radio telescope is a prime-focus telescope. In accordance with the various embodiments, the radio telescope utilized for detecting the thermal emissions by the method disclosed herein has a suitable effective telescope diameter. In one embodiment, the radio telescope has an effective telescope diameter of 3.8 m. In another embodiment, the radio telescope has an effective telescope diameter of 7 m. The examples provided for the effective telescope diameter are merely representative and the radio telescope utilized for detecting the thermal emissions may have another effective telescope diameter. In accordance with the various embodiments, the radio telescope utilized for detecting the thermal emissions by the method disclosed herein has a FWHM beamwidth of a desired value. For example, the FWHM beamwidth of the radio telescope can be less than about 0.5 degree. In one embodiment, the FWHM beamwidth of the radio telescope is 0.5 degree.

In accordance with the various embodiments, the radio telescope utilized for detecting the thermal emissions by the method disclosed herein has a side-lobe level of a desired value. The side-lobe level can be adjusted while building the radio telescope. In one embodiment, the side-lobe level is set to less than about −20 dB. For instance, the side-lobe level can be set to −20 dB, −25dB, and −40 dB etc. The power in the side-lobes is generally less than power in the main beam. Generally, it is desirable to minimize the side-lobe level, which is measured in dB relative to the peak of the main beam. The main lobes and the side-lobes occur during both transmission and reception of signals. For observing the new moon, the side-lobe levels are required to be adjusted in such a manner that the new moon becomes observable even when the new Moon is in close proximity to the Sun. Accordingly, in one embodiment, the side-lobe level is set to −20 dB. In another embodiment, the side-lobe level is set to −25 dB. It will be apparent to those ordinarily skilled in the art that the side-lobe level need not be limited to the values disclosed above and any suitable value for the side-lobe level can be used for detecting the thermal emissions.

In accordance with the various embodiments, the operating frequency of the radio telescope utilized for detecting the thermal emissions by the method disclosed herein can be adjusted to a desired value. At step 102, the operating frequency of the radio telescope is set to a value selected from the range of about 1 GHz to about 100 GHz. In an embodiment, the operating frequency of the radio telescope is set to 1.4 GHz. In another embodiment, the operating frequency of the radio telescope is set to a value selected from the range of about 4 GHz to about 8 GHz such as for example 4.5 GHz. In yet another embodiment, the operating frequency of the radio telescope is set to a value selected from the range of about 26 GHz to about 36 GHz such as for example 26 GHz. It will be apparent to those ordinarily skilled in the art that the operating frequency of the radio telescope need not be limited to the values disclosed above and any suitable value for the operating frequency can be used for detecting the thermal emissions. It is also possible to utilize a radio telescope having a fixed operating frequency, wherein the operating frequency of the radio telescope is fixed while building the radio telescope.

In accordance with the various embodiments, the operating bandwidth of the radio telescope utilized for detecting the thermal emissions by the method disclosed herein can be adjusted to a desired value. At step 104, the operating bandwidth of the radio telescope is set to a value selected from the range of about 1 GHz and about 10 GHz. In an embodiment, the operating bandwidth of the radio telescope is set to 1 GHz. In another embodiment, the operating bandwidth of the radio telescope is set to 1.5 GHz. In yet another embodiment, the operating bandwidth of the radio telescope is set to 5.6 GHz. It will be apparent to those ordinarily skilled in the art that the operating bandwidth of the radio telescope need not be limited to the values disclosed above and any suitable value for the operating bandwidth can be used for detecting the thermal emissions. It is also possible to utilize a radio telescope having a fixed operating bandwidth, wherein the operating bandwidth of the radio telescope is fixed while building the radio telescope.

After the operating frequency and bandwidth of the radio telescope has been set, one or more observations are collected by using the radio telescope at step 106. These observations facilitate in detecting the thermal emissions of the new moon and thereby the new moon itself. Further, these observations assist in detecting the new moon when the new moon is in close proximity to the Sun. In one embodiment, the observations assist in detecting the thermal emissions when the new moon is positioned at an angle of less than about 5 degrees from the Sun. For instance, the observations can assist in detecting the new moon when it is position at an angle of 4.5 or 2 or 3 degrees from the Sun. In another embodiment, the observations assist in detecting the thermal emissions when the new moon is positioned at an angle of less than about 1 degree from the Sun. For instance, the observations assist in detecting the thermal emissions when the new moon is positioned at an angle of 1 or 0.9 or 0.6 degree from the Sun. It will be apparent to those ordinarily skilled in the art that the detection can be performed when the Moon is positioned at other angles with respect to the Sun such as for example when the Moon is positioned at an elongation of 8.9 degree away from the Sun or positioned at a 21 degree elongation from the Sun.

In accordance with the various embodiments, one or more other parameters of the radio telescope utilized for detecting the thermal emissions by the method disclosed herein can be adjusted to a desired value. For instance, the Azimuth drive speed of the radio telescope can be set to a value greater than about 0.5 degrees per second. In one embodiment, the Azimuth drive speed of the radio telescope is set to 0.5 degrees per second. Similarly, the position accuracy of the radio telescope can be set to a value greater than about 0.03 degree. In one embodiment, the position accuracy of the radio telescope is set to 0.03 degree. In a similar manner, the system temperature at zenith of the radio telescope receivers can be set to a value less than about 100 K. In one embodiment, the system temperature at zenith is set to 100K.

In accordance with various embodiments, the radio telescope can be operated by selecting a beam that is equivalent to the apparent moon diameter. In one embodiment, the radio telescope is operated by selecting a beam that is equivalent to the apparent moon diameter of 0.5 degree.

The thermal emissions of the new moon can be detected by collecting observations by utilizing a low-frequency radio telescope. For instance, the observations can be collected by utilizing a radio telescope having an effective telescope diameter of 7 m operated at a frequency of 1.4 GHz. Further, the elevation angle of the radio telescope can be lowered for detecting the radio emissions from the new moon. The thermal emissions of the new moon can also be detected by collecting observations by utilizing a mid-frequency radio telescope. For instance, the observations can be collected by utilizing a radio telescope that can be operated at a frequency value selected from the range of 4 GHz to 8 GHz. The thermal emissions of the new moon can also be detected by collecting observations by utilizing a high-frequency radio telescope. For instance, the observations can be collected by utilizing a dedicated moon telescope that can be operated at a frequency value selected from the range of 26 GHz to 36 GHz. In addition, specially designed radio telescopes can be utilized for detecting the thermal observations. For instance, a radio telescope having an effective telescope diameter of 3.8 m can be developed for detecting the thermal emissions from the new moon. Polarization studies at optical wavelengths can also be performed for detecting the thermal emissions from the new moon.

It will be apparent that there could be numerous variations in the method for detecting the thermal emissions from the new moon and as such those variations will be readily apparent to those to those ordinarily skilled in the art.

Figure 2:
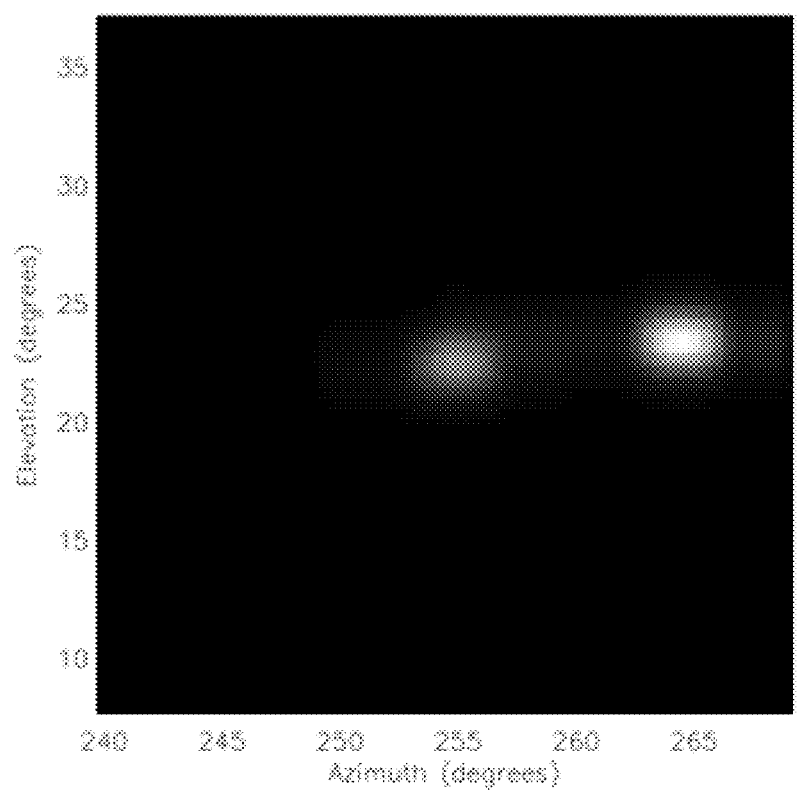
FIG. 2 illustrates an observation of the new moon in accordance with an embodiment of the invention.
Figure 3:
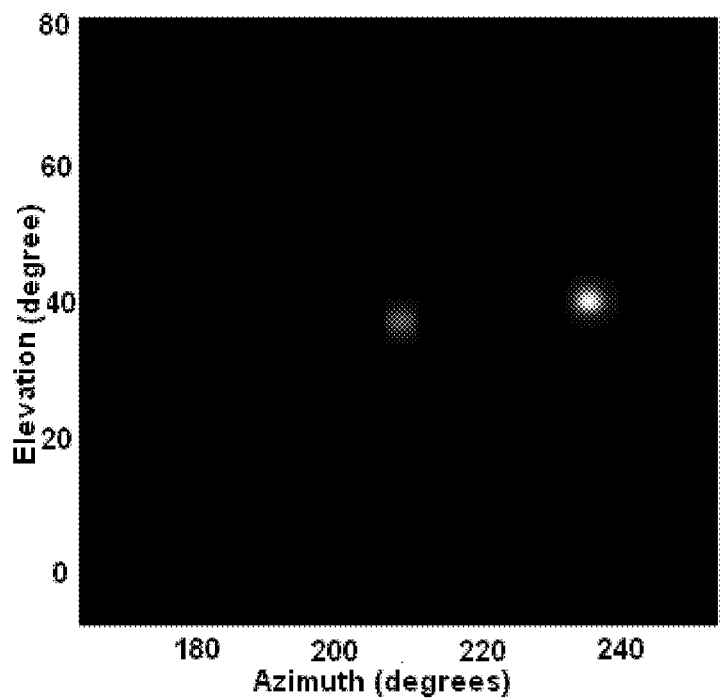
FIG. 3 illustrates an observation of the new moon in accordance with another embodiment of the invention.

FIG. 2 and FIG. 3 illustrate the observations of the new moon in accordance with an exemplary implementation of the method disclosed herein. In accordance with exemplary implementation, the Moon was observed at low elevation, wherein a 7 m radio telescope was lowered to detect the radio emission from the Moon. The observation was extremely clear above the noise and the Moon was detected with a signal to noise ratio>300. In FIG. 2, the weaker (faded) signal represents the new moon at an elongation of 8.9 degrees away from the stronger (brighter) signal that represents the Sun. In FIG. 3, the new moon (weaker signal) is 21 degrees away from the Sun (stronger signal).

In an exemplary implementation of the method disclosed herein, a radio telescope with an effective telescope diameter of 32 m was utilized for detecting the thermal emissions from the new moon. In accordance with the exemplary implementation, the radio telescope was operated at an operating frequency of 5 GHz. Further, in accordance with the exemplary implementation, the new moon was very close to the sun and to the local horizon.

Figure 4:
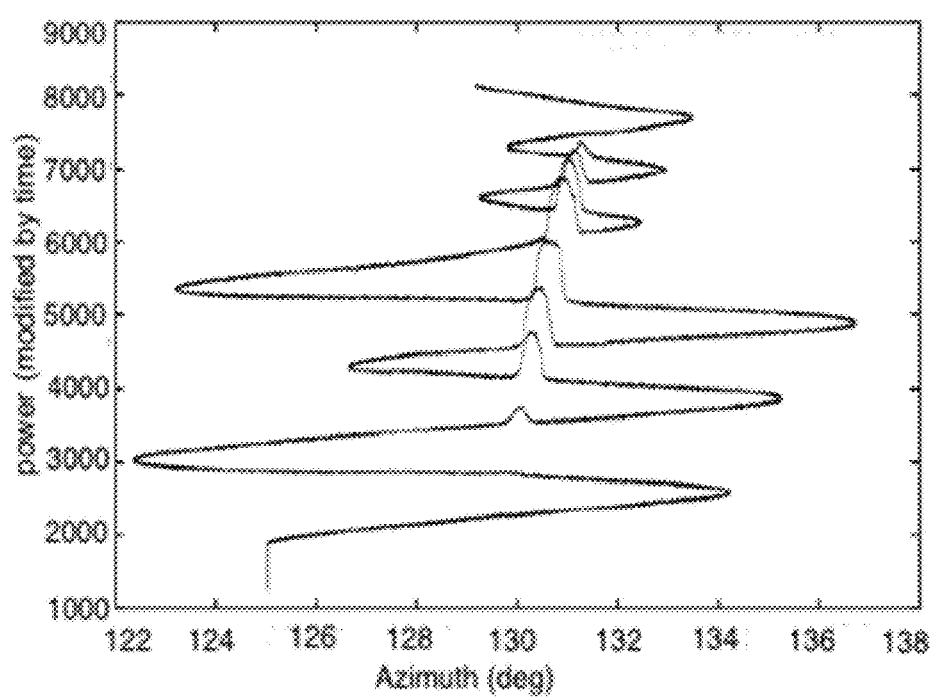
FIG. 4 illustrates a raster scan of the new moon in accordance with an embodiment of the invention.

FIG. 4 illustrates a raster scan of the new moon detected with the radio telescope of diameter 32 m operating at the operating frequency of 5 GHz. As shown in FIG. 4, the x-axis and the y-axis represent Azimuth (degrees) and power values respectively. The central blob shown in FIG. 4 represents the beam that sweeps the Moon. The raster scan shown in FIG. 4 was obtained when the new moon was 2 degrees above the horizon and the Sun was about 2 degrees above the Moon.

Various embodiments of the invention enable detection of the new moon when the new moon is in close proximity to the Sun such as when the new moon is 5 degree or 1 degree away from the Sun. Further, the invention enables detection of the new moon from various locations of the world under different weather conditions and elevation angles.

Those skilled in the art will realize that the above recognized advantages and other advantages described herein are merely exemplary and are not meant to be a complete rendering of all of the advantages of the various embodiments of the invention.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for detecting thermal emissions from the new moon, wherein the new moon is positioned at an angle of less than about 5 degrees from the Sun, wherein the thermal emissions are detected using a radio telescope, wherein an effective telescope diameter of the radio telescope depends on a wavelength of operation and wherein a Full Width at Half Maximum (FWHM) beamwidth of the radio telescope is less than or equal to about 0.5 degree, the method comprising:

setting the operating frequency of the radio telescope to a value selected from the range of about 1 GHz and about 100 GHz;

setting the operating bandwidth of the radio telescope to a value selected from the range of about 1 GHz and about 10 GHz; and collecting at least one observation from the radio telescope to detect the thermal emissions from the new moon.

2. The method of claim 1, wherein a side-lobe level of the radio telescope is less than about −20dB.

3. The method of claim 1, wherein a side-lobe level is about −20 dB.

4. The method of claim 1 further comprising setting the Azimuth drive speed of the radio telescope to a value greater than or equal to about 0.5 degrees per second.

5. The method of claim 1 further comprising setting the position accuracy of the radio telescope to a value greater than or equal to about 0.03 degree.

6. The method of claim 1 further comprising setting the system temperature at zenith of the radio telescope receivers to a value less than about 100 K.

7. The method of claim 1, wherein the FWHM beamwidth of the radio telescope is 0.5 degree.

8. The method of claim 1, wherein the operating frequency of the radio telescope is set to 1.4 GHz.

9. The method of claim 1, wherein the operating frequency of the radio telescope is set to a value selected from the range of about 4 GHz to about 8 GHz.

10. The method of claim 1 further comprising selecting a beamwidth that is equivalent to the apparent Moon diameter of about 0.5 degree.

11. The method of claim 1, wherein the effective telescope diameter of the radio telescope is about 3.8 meter.

12. The method of claim 1, wherein the new moon is positioned at an angle of less than about 1 degree from the Sun.

* * * * *